United States Patent
Sekiya

(10) Patent No.: US 9,149,886 B2
(45) Date of Patent: Oct. 6, 2015

(54) MODIFIED LAYER FORMING METHOD

(71) Applicant: Disco Corporation, Tokyo (JP)

(72) Inventor: Kazuma Sekiya, Tokyo (JP)

(73) Assignee: Disco Corporation, Tokyo (JP)

( * ) Notice: Subject to any disclaimer, the term of this patent is extended or adjusted under 35 U.S.C. 154(b) by 113 days.

(21) Appl. No.: 13/893,783

(22) Filed: May 14, 2013

(65) Prior Publication Data

US 2013/0306605 A1  Nov. 21, 2013

(30) Foreign Application Priority Data

May 17, 2012  (JP) .................................. 2012-113573

(51) Int. Cl.
  *B23K 26/00*  (2014.01)
  *B23K 26/08*  (2014.01)
(52) U.S. Cl.
  CPC ......... *B23K 26/0063* (2013.01); *B23K 26/0042* (2013.01); *B23K 26/0057* (2013.01); *B23K 26/0853* (2013.01); *B23K 26/0869* (2013.01)
(58) Field of Classification Search
  CPC ........... B23K 26/0057; B23K 26/0853; B23K 26/0869; B23K 26/4075; H01L 21/2633
  USPC ............. 219/121.61, 121.68, 121.69, 121.78, 219/121.85; 438/460, 463, 465
  See application file for complete search history.

(56) References Cited

U.S. PATENT DOCUMENTS

| | | | | |
|---|---|---|---|---|
| 4,092,518 | A | * | 5/1978 | Merard .................... 219/121.69 |
| 5,575,936 | A | * | 11/1996 | Goldfarb .................. 219/121.68 |
| 5,637,244 | A | * | 6/1997 | Erokhin ................... 219/121.69 |
| 6,596,967 | B2 | * | 7/2003 | Miesak .................... 219/121.69 |
| 6,727,460 | B2 | * | 4/2004 | Troitski ................... 219/121.68 |
| 6,777,104 | B2 | * | 8/2004 | Colea ......................... 428/542.2 |
| 8,865,566 | B2 | * | 10/2014 | Fukuyo et al. ................ 438/460 |

FOREIGN PATENT DOCUMENTS

| | | |
|---|---|---|
| JP | 07-076167 | 3/1995 |
| JP | 2002-192370 | 7/2002 |

* cited by examiner

*Primary Examiner* — Mark Paschall
(74) *Attorney, Agent, or Firm* — Greer Burns & Crain, Ltd.

(57) ABSTRACT

A modified layer forming method of applying a pulsed laser beam having a transmission wavelength to a workpiece through a predetermined beam entrance surface in the condition where the focal point of the pulsed laser beam is set inside the workpiece, thereby forming a desired modified layer inside the workpiece. The modified layer forming method includes the step of reducing the power of the pulsed laser beam to a power that cannot process the workpiece when a surface adjacent to the beam entrance surface of the workpiece is located at the beam entrance position of the pulsed laser beam.

5 Claims, 9 Drawing Sheets

_MODIFIED LAYER FORMING METHOD_

BACKGROUND OF THE INVENTION

1. Field of the Invention

The present invention relates to a modified layer forming method of applying a pulsed laser beam having a transmission wavelength to a workpiece in the condition where the focal point of the pulsed laser beam is set inside the workpiece, thereby forming a modified layer inside the workpiece.

2. Description of the Related Art

There is in practical use an internal processing technique of applying a pulsed laser beam having a transmission wavelength to a transparent or translucent workpiece in the condition where the focal point of the pulsed laser beam is set inside the workpiece, thereby forming a modified layer inside the workpiece to create a pattern, figure, or character (see Japanese Patent Laid-open No. Hei 7-76167, for example).

There is also in practical use an internal processing technique of applying a pulsed laser beam having a transmission wavelength to a wafer such as a silicon wafer and a sapphire wafer along a plurality of crossing division lines partitioning a plurality of devices such as ICs, LSIs, and LEDs formed on the front side of the wafer, in the condition where the focal point of the pulsed laser beam is set inside the wafer, thereby forming a modified layer as a division start point inside the wafer along each division line (see Japanese Patent No. 3408805, for example).

SUMMARY OF THE INVENTION

In these internal processing techniques mentioned above, however, there is a problem such that when the focal point of the pulsed laser beam is located on the surface of the workpiece, ablation occurs to hinder the execution of internal processing.

It is therefore an object of the present invention to provide a modified layer forming method which can avoid the occurrence of ablation even when the focal point of the pulsed laser beam is located on the surface of the workpiece.

In accordance with an aspect of the present invention, there is provided a modified layer forming method of applying a pulsed laser beam having a transmission wavelength to a workpiece to thereby form a modified layer inside the workpiece, the modified layer forming method including a modified layer forming step of applying the pulsed laser beam to the workpiece through a beam entrance surface perpendicular to an optical path of the pulsed laser beam in the condition where the focal point of the pulsed laser beam is set inside the workpiece, thereby forming the modified layer inside the workpiece; and a power reducing step of reducing the power of the pulsed laser beam to a power that cannot process the workpiece when a surface adjacent to the beam entrance surface of the workpiece is located at the beam entrance position of the pulsed laser beam. Preferably, the power that cannot process the workpiece in the power reducing step includes zero power.

In the modified layer forming method according to the present invention, the power of the pulsed laser beam is reduced to a power that cannot process the workpiece when a surface adjacent to the beam entrance surface of the workpiece through which the pulsed laser beam is applied is located at the beam entrance position of the pulsed laser beam. Accordingly, even when the focal point of the pulsed laser beam is located on this surface adjacent to the beam entrance surface of the workpiece, no ablation occurs.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
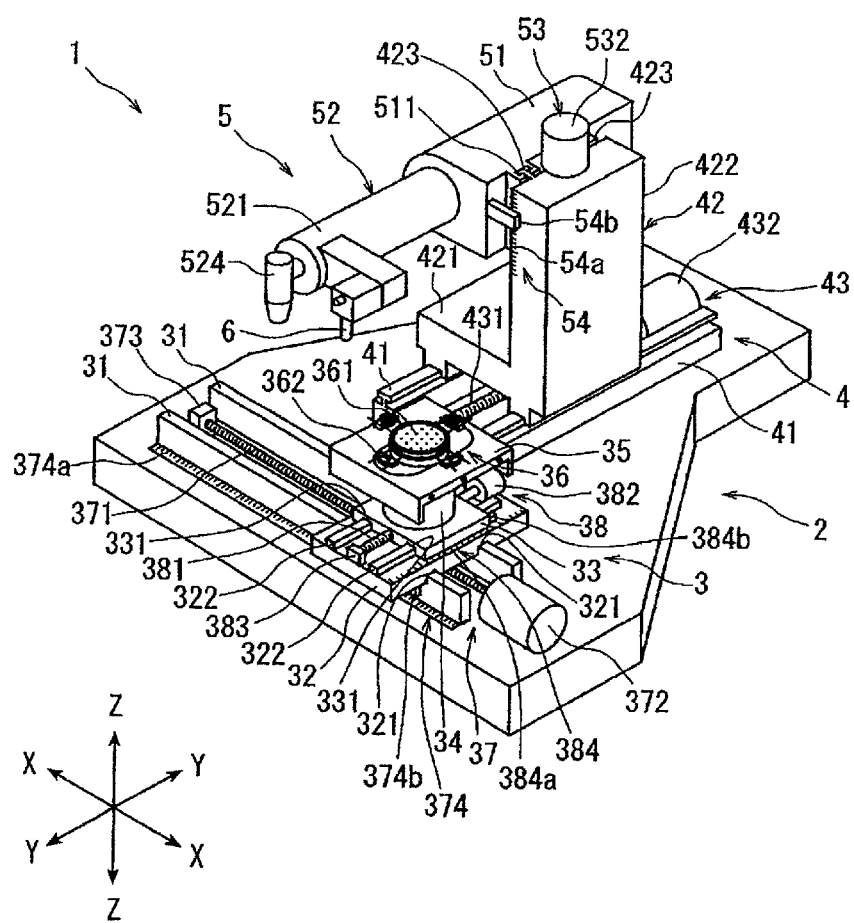
FIG. 1 is a perspective view of a laser processing apparatus for performing the modified layer forming method according to the present invention.

Preferred embodiments of the modified layer forming method according to the present invention will now be described in detail with reference to the attached drawings. FIG. 1 is a perspective view of a laser processing apparatus 1 for performing the modified layer forming method according to the present invention. The laser processing apparatus 1 shown in FIG. 1 includes a stationary base 2, a chuck table mechanism 3 for holding a workpiece, the chuck table mechanism 3 being provided on the stationary base 2 so as to be movable in a feeding direction (X direction) shown by an arrow X, a laser beam applying unit supporting mechanism 4 provided on the stationary base 2 so as to be movable in an indexing direction (Y direction) shown by an arrow Y perpendicular to the X direction, and a laser beam applying unit 5 provided on the laser beam applying unit supporting mechanism 4 so as to be movable in a focal position adjusting direction (Z direction) shown by an arrow Z.

The chuck table mechanism 3 includes a pair of guide rails 31 provided on the stationary base 2 so as to extend parallel to each other in the X direction, a first slide block 32 provided on the guide rails 31 so as to be movable in the X direction, a second slide block 33 provided on the first slide block 32 so as to be movable in the Y direction, a cover table 35 supported by a cylindrical member 34 standing on the second slide block 33, and a chuck table 36 as workpiece holding means. The chuck table 36 has a vacuum chuck 361 formed of a porous material. A workpiece such as a disk-shaped semiconductor wafer is adapted to be held under suction on the vacuum chuck 361 by operating suction means (not shown). The chuck table 36 is rotatable by a pulse motor (not shown) provided in the cylindrical member 34. Further, the chuck table 36 is provided with clamps 362 for fixing an annular frame to be hereinafter described.

The lower surface of the first slide block 32 is formed with a pair of guided grooves 321 for slidably engaging the pair of guide rails 31 mentioned above. A pair of guide rails 322 are provided on the upper surface of the first slide block 32 so as to extend parallel to each other in the Y direction. Accordingly, the first slide block 32 is movable in the X direction along the guide rails 31 by the slidable engagement of the guided grooves 321 with the guide rails 31. The chuck table mechanism 3 further includes feeding means 37 for moving the first slide block 32 in the X direction along the guide rails 31. The feeding means 37 includes an externally threaded rod 371 extending parallel to the guide rails 31 so as to be interposed therebetween and a pulse motor 372 as a drive source for rotationally driving the externally threaded rod 371. The externally threaded rod 371 is rotatably supported at one end thereof to a bearing block 373 fixed to the stationary base 2 and is connected at the other end to the output shaft of the pulse motor 372 so as to receive the torque thereof. The externally threaded rod 371 is engaged with a tapped through hole formed in an internally threaded block (not shown) projecting from the lower surface of the first slide block 32 at a central portion thereof. Accordingly, the first slide block 32 is moved in the X direction along the guide rails 31 by operating the pulse motor 372 to normally or reversely rotate the externally threaded rod 371.

The laser processing apparatus 1 includes X position detecting means 374 for detecting the feed amount, or X position of the chuck table 36. The X position detecting means 374 includes a linear scale 374a extending along one of the guide rails 31 and a read head 374b provided on the first slide block 32 and movable along the linear scale 374a together with the first slide block 32. The read head 374b of the X position detecting means 374 transmits a pulse signal of one pulse every 1 μm in this preferred embodiment to control means which will be hereinafter described. This control means counts the number of pulses as the pulse signal input from the read head 374b to thereby detect the feed amount, or X position of the chuck table 36. In the case that the pulse motor 372 is used as the drive source for the feeding means 37 as in this preferred embodiment, the number of pulses as a drive signal output from the control means to the pulse motor 372 may be counted by the control means to thereby detect the feed amount, or X position of the chuck table 36.

The lower surface of the second slide block 33 is formed with a pair of guided grooves 331 for slidably engaging the pair of guide rails 322 provided on the upper surface of the first slide block 32 as mentioned above. Accordingly, the second slide block 33 is movable in the Y direction along the guide rails 322 by the slidable engagement of the guided grooves 331 with the guide rails 322. The chuck table mechanism 3 further includes first indexing means 38 for moving the second slide block 33 in the Y direction along the guide rails 322 provided on the first slide block 32. The first indexing means 38 includes an externally threaded rod 381 extending parallel to the guide rails 322 so as to be interposed therebetween and a pulse motor 382 as a drive source for rotationally driving the externally threaded rod 381. The externally threaded rod 381 is rotatably supported at one end thereof to a bearing block 383 fixed to the upper surface of the first slide block 32 and is connected at the other end to the output shaft of the pulse motor 382 so as to receive the torque thereof. The externally threaded rod 381 is engaged with a tapped through hole formed in an internally threaded block (not shown) projecting from the lower surface of the second slide block 33 at a central portion thereof. Accordingly, the second slide block 33 is moved in the Y direction along the guide rails 322 by operating the pulse motor 382 to normally or reversely rotate the externally threaded rod 381.

The laser processing apparatus 1 includes Y position detecting means 384 for detecting the index amount, or Y position of the chuck table 36. The Y position detecting means 384 includes a linear scale 384a extending along one of the guide rails 322 and a read head 384b provided on the second slide block 33 and movable along the linear scale 384a together with the second slide block 33. The read head 384b of the Y position detecting means 384 transmits a pulse signal of one pulse every 1 μm in this preferred embodiment to the control means. This control means to be described later counts the number of pulses as the pulse signal input from the read head 384b to thereby detect the index amount, or Y position of the chuck table 36. In the case that the pulse motor 382 is used as the drive source for the first indexing means 38 as in this preferred embodiment, the number of pulses as a drive signal output from the control means to the pulse motor 382 may be counted by the control means to thereby detect the index amount, or Y position of the chuck table 36.

The laser beam applying unit supporting mechanism 4 includes a pair of guide rails 41 provided on the stationary base 2 so as to extend parallel to each other in the Y direction and a movable support base 42 provided on the guide rails 41 so as to be movable in the Y direction. The movable support base 42 is composed of a horizontal portion 421 slidably supported to the guide rails 41 and a vertical portion 422 extending vertically upward from the upper surface of the horizontal portion 421. Further, a pair of guide rails 423 are provided on one side surface of the vertical portion 422 so as to extend parallel to each other in the Z direction. The laser beam applying unit supporting mechanism 4 further includes second indexing means 43 for moving the movable support base 42 in the Y direction along the guide rails 41. The second indexing means 43 includes an externally threaded rod 431 extending parallel to the guide rails 41 so as to be interposed therebetween and a pulse motor 432 as a drive source for rotationally driving the externally threaded rod 431. The externally threaded rod 431 is rotatably supported at one end thereof to a bearing block (not shown) fixed to the stationary base 2 and is connected at the other end to the output shaft of the pulse motor 432 so as to receive the torque thereof. The externally threaded rod 431 is engaged with a tapped through hole formed in an internally threaded block (not shown) projecting from the lower surface of the horizontal portion 421 of the movable support base 42 at a central portion thereof. Accordingly, the movable support base 42 is moved in the Y direction along the guide rails 41 by operating the pulse motor 432 to normally or reversely rotate the externally threaded rod 431.

The laser beam applying unit 5 includes a unit holder 51 and laser beam applying means 52 mounted to the unit holder 51. The unit holder 51 is formed with a pair of guided grooves 511 for slidably engaging the pair of guide rails 423 provided on the vertical portion 422. Accordingly, the unit holder 51 is supported to the movable support base 42 so as to be movable in the Z direction by the slidable engagement of the guided grooves 511 with the guide rails 423.

The laser beam applying unit 5 further includes focal position adjusting means 53 for moving the unit holder 51 along the guide rails 423 in the Z direction. The focal position adjusting means 53 includes an externally threaded rod (not shown) extending parallel to the guide rails 423 so as to be interposed therebetween and a pulse motor 532 as a drive source for rotationally driving this externally threaded rod. Accordingly, the unit holder 51 and the laser beam applying means 52 are moved in the Z direction along the guide rails 423 by operating the pulse motor 532 to normally or reversely rotate this externally threaded rod (not shown). In this preferred embodiment, when the pulse motor 532 is normally operated, the laser beam applying means 52 is moved upward, whereas when the pulse motor 532 is reversely operated, the laser beam applying means 52 is moved downward.

The laser beam applying unit 5 further includes Z position detecting means 54 for detecting the Z position of the laser beam applying means 52. The Z position detecting means 54 includes a linear scale 54a extending along one of the guide rails 423 and a read head 54b provided on the unit holder 51 and movable along the linear scale 54a together with the unit holder 51. The read head 54b of the Z position detecting means 54 transmits a pulse signal of one pulse every 0.1 μm in this preferred embodiment to the control means to be described later.

Figure 2:
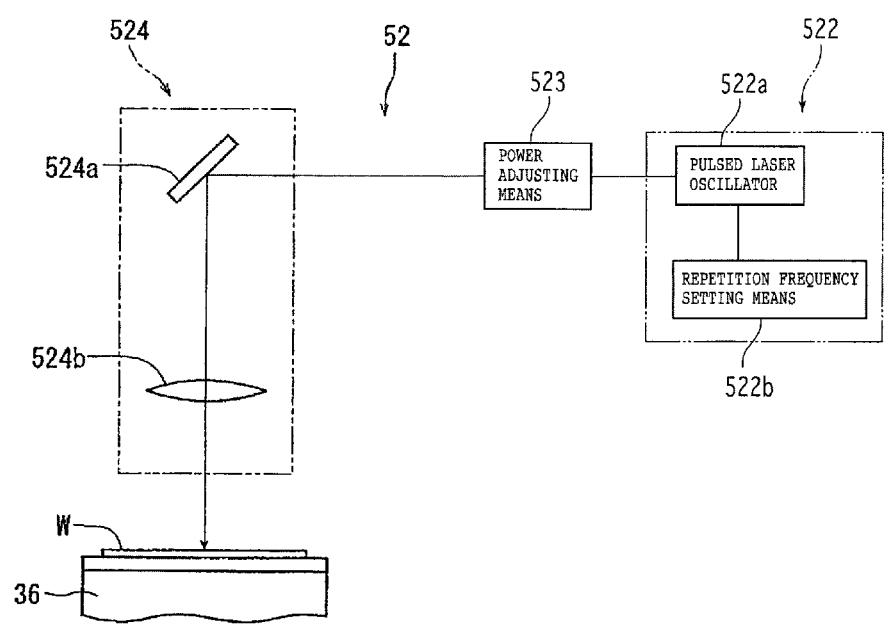
FIG. 2 is a block diagram showing the configuration of laser beam applying means included in the laser processing apparatus shown in FIG. 1.

The laser beam applying means 52 includes a cylindrical casing 521 fixed to the unit holder 51 so as to extend in a substantially horizontal direction. The configuration of the laser beam applying means 52 will now be described with reference to FIG. 2. The laser beam applying means 52 includes pulsed laser beam oscillating means 522 provided in the casing 521, power adjusting means 523 for adjusting the power of a pulsed laser beam oscillated by the pulsed laser beam oscillating means 522, and focusing means 524 for applying the pulsed laser beam whose power has been adjusted by the power adjusting means 523 to a workpiece W held on the holding surface of the chuck table 36.

The pulsed laser beam oscillating means 522 is composed of a pulsed laser oscillator 522a for oscillating a pulsed laser beam and repetition frequency setting means 522b for setting the repetition frequency of the pulsed laser beam to be oscillated by the pulsed laser oscillator 522a. The power adjusting means 523 functions to adjust the power of the pulsed laser beam oscillated by the pulsed laser beam oscillating means 522 to a predetermined power. All of the pulsed laser oscillator 522a and the repetition frequency setting means 522b of the pulsed laser beam oscillating means 522 and the power adjusting means 523 are controlled by the control means.

The focusing means 524 includes a direction changing mirror 524a for changing the traveling direction of the pulsed laser beam oscillated by the pulsed laser beam oscillating means 522 and adjusted in power by the power adjusting means 523 toward the holding surface of the chuck table 36 and a focusing lens 524b for focusing the pulsed laser beam whose traveling direction has been changed by the direction changing mirror 524a and applying the pulsed laser beam to the workpiece W held on the chuck table 36. The focusing means 524 is mounted on the front end of the casing 521 as shown in FIG. 1.

Referring back to FIG. 1, the laser processing apparatus 1 further includes imaging means 6 provided at the front end portion of the casing 521 for detecting a subject area of the workpiece to be laser-processed by the laser beam applying means 52. The imaging means 6 includes an ordinary imaging device (CCD) for imaging the workpiece by using visible light, infrared light applying means for applying infrared light to the workpiece, an optical system for capturing the infrared light applied to the workpiece by the infrared light applying means, and an imaging device (infrared CCD) for outputting an electrical signal corresponding to the infrared light captured by the optical system. An image signal output from the imaging means 6 is transmitted to the control means 7 (see FIG. 3).

Figure 3:
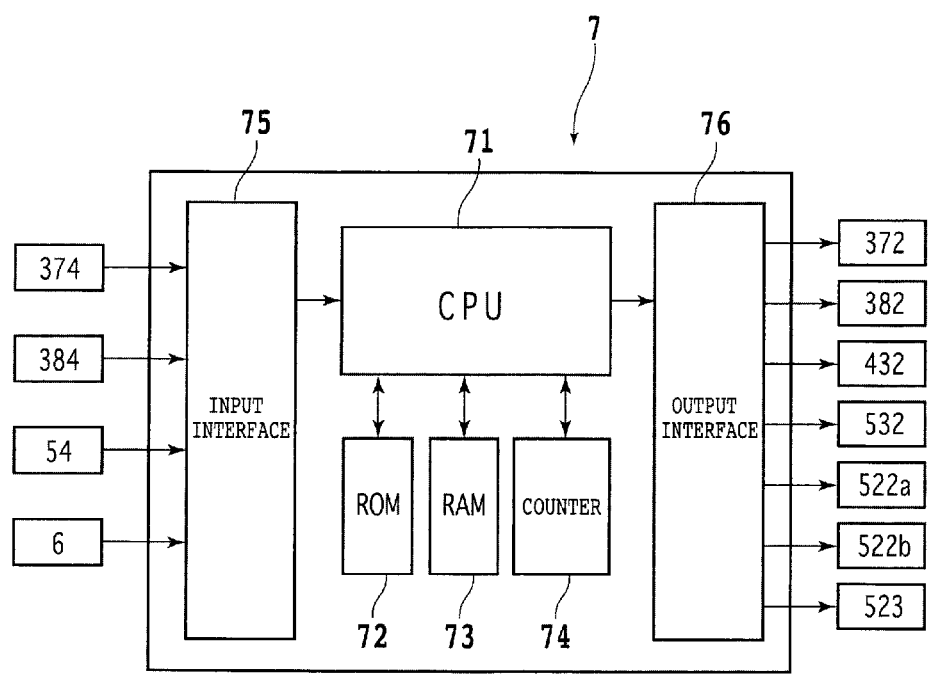
FIG. 3 is a block diagram showing the configuration of control means included in the laser processing apparatus shown in FIG. 1.

The laser processing apparatus 1 includes the control means 7 shown in FIG. 3. The control means 7 is configured by a computer, and it includes a central processing unit (CPU) 71 for performing operational processing according to a control program, a read only memory (ROM) 72 preliminarily storing the control program, a random access memory (RAM) 73 for storing data on design value for the workpiece, the results of computation, etc., a counter 74, an input interface 75, and an output interface 76. Detection signals from the X position detecting means 374, the Y position detecting means 384, the Z position detecting means 54, and the imaging means 6 are input into the input interface 75 of the control means 7. On the other hand, control signals are output from the output interface 76 of the control means 7 to the pulse motor 372, the pulse motor 382, the pulse motor 432, the pulse motor 532, the pulsed laser oscillator 522a and the repetition frequency setting means 522b of the laser beam applying means 52, and the power adjusting means 523.

Figure 4A:
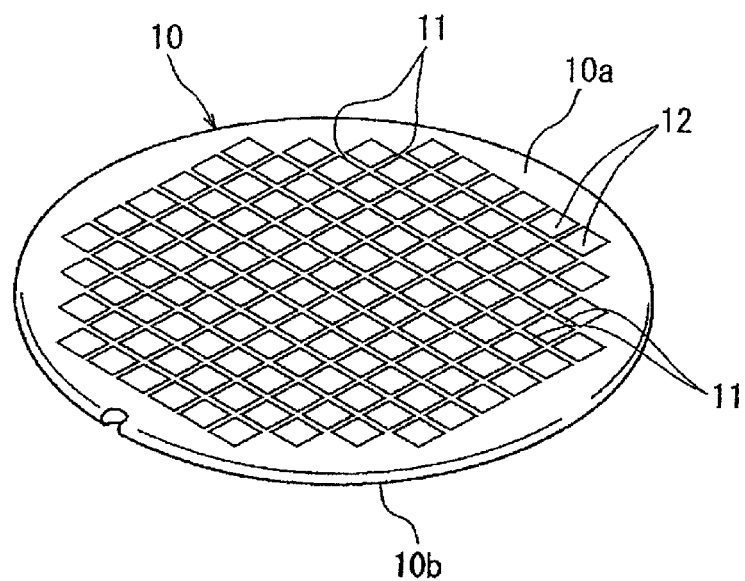
FIG. 4A is a perspective view of a semiconductor wafer to be processed by a first preferred embodiment of the modified layer forming method according to the present invention.
Figure 4B:
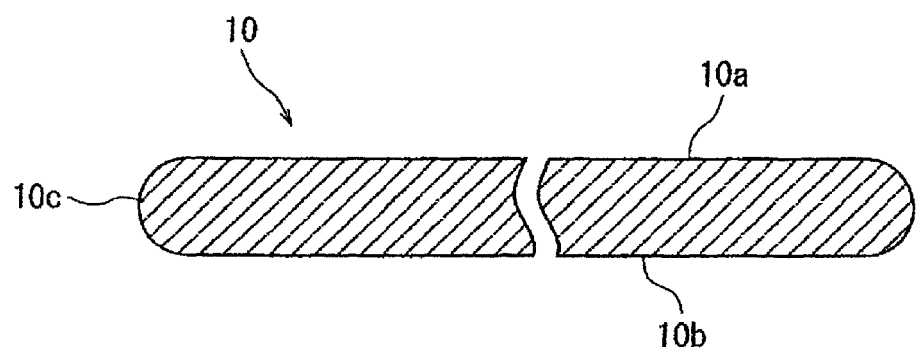
FIG. 4B is an enlarged sectional view of an essential part of the semiconductor wafer shown in FIG. 4A.

There will now be described a first preferred embodiment of the modified layer forming method to be performed by using the laser processing apparatus 1 mentioned above. FIG. 4A is a perspective view of a semiconductor wafer 10 as a workpiece, and FIG. 4B is an enlarged sectional view of an essential part of the semiconductor wafer 10. The semiconductor wafer 10 shown in FIG. 4A is formed from a silicon substrate having a thickness of 200 μm, for example. The semiconductor wafer 10 has a front side 10a and a back side 10b. A plurality of crossing streets 11 are formed on the front side 10a of the semiconductor wafer 10, thereby partitioning a plurality of rectangular regions where a plurality of devices 12 such as ICs and LSIs are respectively formed. As shown in FIG. 4B, the outer circumferential portion of the semiconductor wafer 10 thus formed is chamfered to form an arcuate surface 10c ranging from the front side 10a to the back side 10b in order to prevent the occurrence of cracking or chipping due to inadvertent impact.

Figure 5:
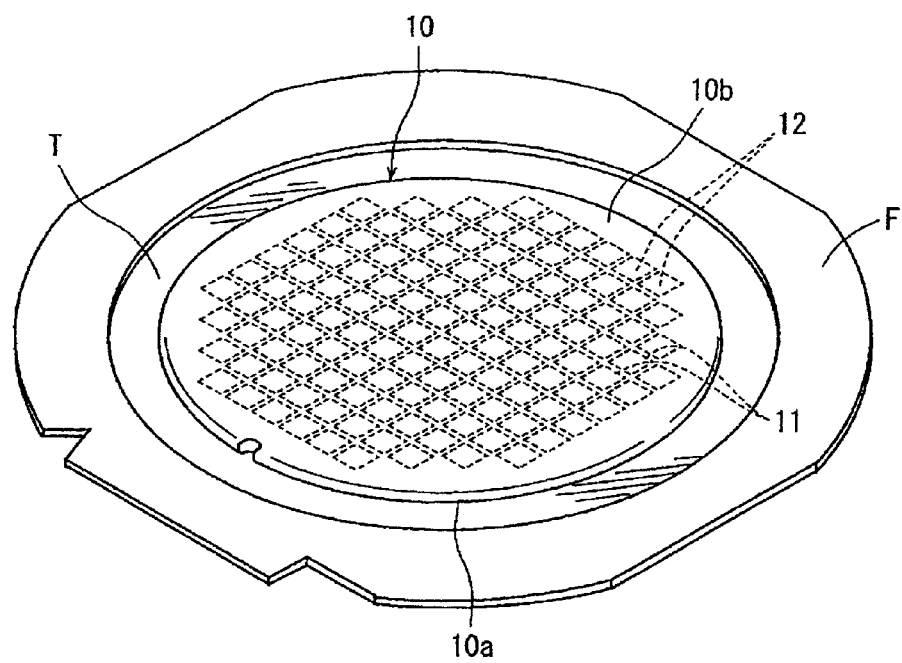
FIG. 5 is a perspective view of the semiconductor wafer shown in FIG. 4A in the condition where it is attached to a dicing tape supported to an annular frame.

As shown in FIG. 5, the front side 10a of the semiconductor wafer 10 is attached to a dicing tape T supported to an annular frame F (wafer attaching step). Accordingly, the back side 10b of the semiconductor wafer 10 attached to the dicing tape T is oriented upward. After performing the wafer attaching step mentioned above, the semiconductor wafer 10 supported through the dicing tape T to the annular frame F is placed on the chuck table 36 of the laser processing apparatus 1 shown in FIG. 1 in the condition where the dicing tape T comes into contact with the upper surface of the chuck table 36. Thereafter, the suction means (not shown) is operated to hold the semiconductor wafer 10 through the dicing tape T on the chuck table 36 under suction (wafer holding step). Accordingly, the semiconductor wafer 10 is held on the chuck table 36 in the condition where the back side 10b of the semiconductor wafer 10 is oriented upward.

After performing the wafer holding step mentioned above, the feeding means 37 is operated to move the chuck table 36 holding the semiconductor wafer 10 to a position directly below the imaging means 6. In the condition where the chuck table 36 is positioned directly below the imaging means 6, an alignment operation is performed by the imaging means 6 and the control means 7 to detect a subject area of the semiconductor wafer 10 to be laser-processed. More specifically, the imaging means 6 and the control means 7 perform image processing such as pattern matching for making the alignment of the streets 11 extending in a first direction on the semiconductor wafer 10 and the focusing means 524 of the laser beam applying means 52 for applying the laser beam along the streets 11, thereby performing the alignment of a laser beam applying position. This alignment operation is performed similarly for the other streets 11 extending in a second direction perpendicular to the first direction mentioned above on the semiconductor wafer 10. Although the front side 10a of the semiconductor wafer 10 on which the streets 11 are formed is oriented downward, the streets 11 can be imaged from the back side 10b through the semiconductor wafer 10 because the imaging means 6 includes the infrared light applying means for applying infrared light, the optical system for capturing the infrared light, and the imaging device (infrared CCD) for outputting an electrical signal corresponding to the infrared light as mentioned above.

Figure 6A:
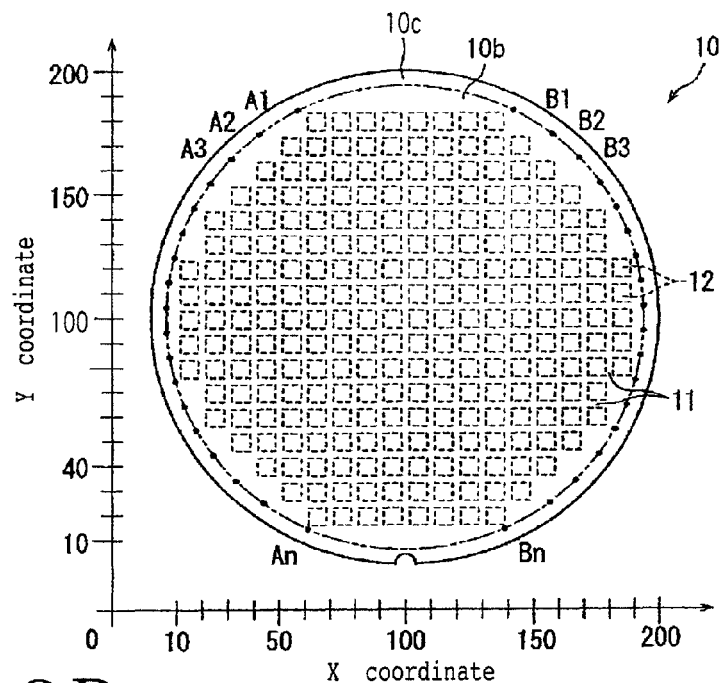
FIG. 6A is a plan view showing the relation between the semiconductor wafer shown in FIG. 4A and coordinates in the condition where the semiconductor wafer is held at a predetermined position on a chuck table included in the laser processing apparatus shown in FIG. 1.
Figure 6B:
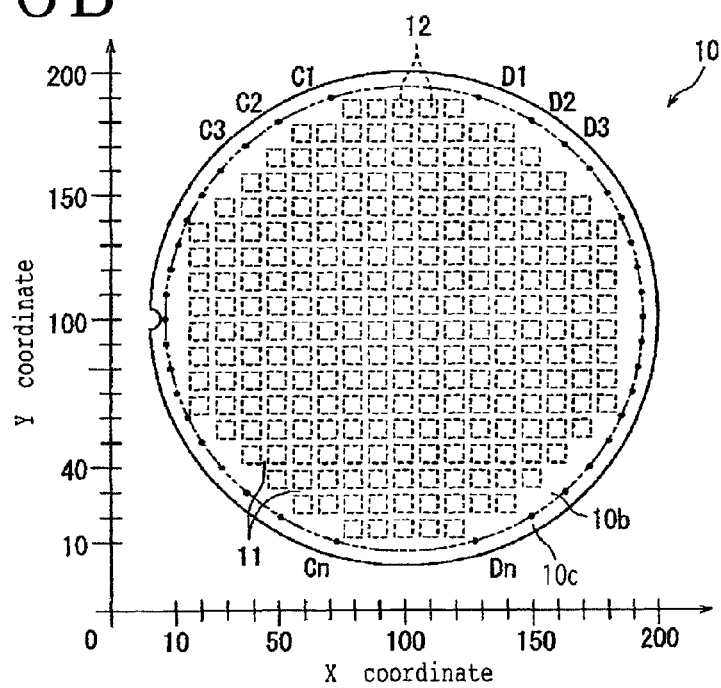
FIG. 6B is a view similar to FIG. 6A, showing a condition obtained by 90° rotating the semiconductor wafer shown in FIG. 6A.

In the alignment operation mentioned above, the semiconductor wafer 10 held on the chuck table 36 is set at the coordinate position shown in FIG. 6A. By 90° rotating the chuck table 36 holding the semiconductor wafer 10 from the condition shown in FIG. 6A, the condition shown in FIG. 6B is obtained.

In the coordinate position of the semiconductor wafer 10 shown in FIG. 6A, symbols Al to An denote the coordinate values for the feed start positions on the streets 11 extending in the first direction, and symbols B1 to Bn denote the coordinate values for the feed stop positions on the streets 11 extending in the first direction. In the coordinate position of the semiconductor wafer 10 shown in FIG. 6B, symbols C1 to Cn denote the coordinate values for the feed start positions on the streets 11 extending in the second direction, and symbols D1 to Dn denote the coordinate values for the feed stop positions on the streets 11 extending in the second direction. These coordinate values A1 to An, B1 to Bn, C1 to Cn, and D1 to Dn are stored as data on design values for the workpiece in the random access memory (RAM) 73 of the control means 7. These coordinate values A1 to An, B1 to Bn, C1 to Cn, and D1 to Dn are set on the boundary between the back side 10b of the semiconductor wafer 10 and the arcuate surface 10c adjacent to the back side 10b, wherein the back side 10b is a beam entrance surface from which the pulsed laser beam enters the semiconductor wafer 10.

Figure 7A:
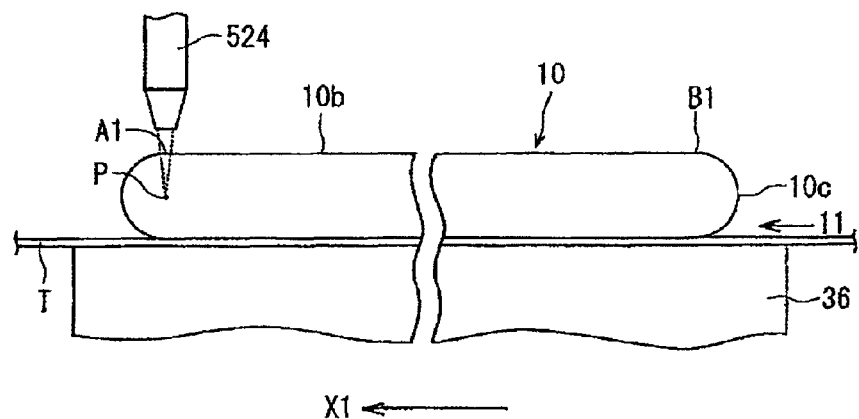
FIGS. 7A and 7B are partially cutaway sectional side views for illustrating the first preferred embodiment of the modified layer forming method according to the present invention.
Figure 7B:
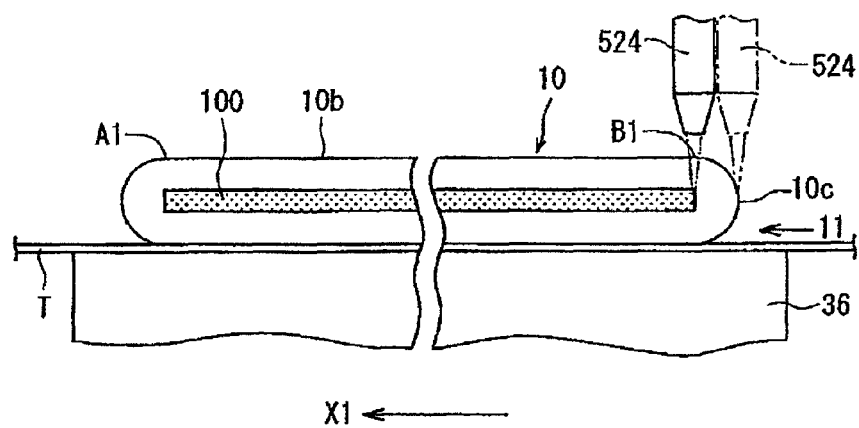

After performing the alignment step mentioned above, the chuck table 36 is moved to position the uppermost street 11 as viewed in FIG. 6A directly below the focusing means 524 of the laser beam applying means 52 constituting the laser beam applying unit 5. Furthermore, the feed start position having the coordinate value A1 on this uppermost street 11 is positioned directly below the focusing means 524 as shown in FIG. 7A. Furthermore, as shown in FIG. 7A, the focal position adjusting means 53 is operated to set the focal point P of the laser beam to be applied from the focusing means 524 at an intermediate position in the semiconductor wafer 10 along the thickness thereof. Thereafter, the pulsed laser beam having a transmission wavelength to the silicon substrate constituting the semiconductor wafer 10 is applied from the focusing means 524 of the laser beam applying means 52, and at the same time the chuck table 36 is moved in the feeding direction shown by an arrow X1 in FIG. 7A at a predetermined feed speed. When the feed stop position having the coordinate value B1 on the uppermost street 11 has reached the position directly below the focusing means 524 of the laser beam applying means 52 as shown in FIG. 7B, the control means 7 outputs a control signal to the power adjusting means 523 so as to reduce the power of the pulsed laser beam oscillated by the pulsed laser beam oscillating means 522. At this time, the reduced power of the pulsed laser beam is a power that cannot process the semiconductor wafer 10 as a workpiece and includes zero power. Accordingly, when the chuck table 36 is moved in the direction of the arrow X1 and the arcuate surface 10c of the semiconductor wafer 10 at the outer circumferential portion thereof is passed through the beam entrance position of the pulsed laser beam directly below the focusing means 524, the focal point P of the pulsed laser beam comes to the arcuate surface 10c. At this time, the power of the pulsed laser beam has already been reduced, so that no ablation occurs. As a result, as shown in FIG. 7B, a proper modified layer 100 is formed in the semiconductor wafer 10 along the uppermost street 11 in the predetermined range from the position A1 to the position B1, i.e., inside the arcuate surface 10c.

For example, the modified layer forming step mentioned above is performed under the following processing conditions.

Light source: semiconductor pumped solid-state pulsed laser (Nd:YAG)
Wavelength: 1064 nm
Repetition frequency: 100 kHz
Average power: 0.2 W
Focused spot diameter: 1 μm
Work feed speed: 100 mm/s After performing the modified layer forming step along all of the streets 11 extending in the first direction on the semiconductor wafer 10 as mentioned above, the chuck table 36 is rotated 90° to similarly perform the modified layer forming step along all of the other streets 11 extending in the second direction perpendicular to the first direction. Thereafter, the semiconductor wafer 10 is transported to the next stage for performing a dividing step of dividing the semiconductor wafer 10 along the streets 11 under which the modified layers 100 have been formed.

Figure 8:
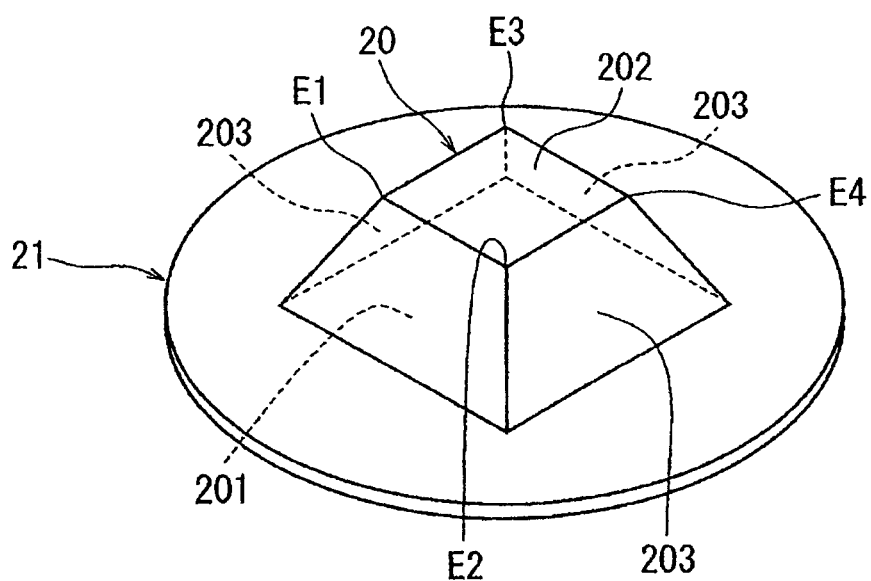
FIG. 8 is a perspective view of a workpiece to be processed by a second preferred embodiment of the modified layer forming method according to the present invention in the condition where the workpiece is mounted on a substrate.

There will now be described a second preferred embodiment of the modified layer forming method to be performed by using the laser processing apparatus 1 mentioned above. FIG. 8 is a perspective view of a workpiece 20 mounted on the front side (upper surface) of a substrate 21 by means of a wax. The workpiece 20 is formed of glass and has a shape of truncated rectangular pyramid. The workpiece 20 has a square lower surface 201, a square upper surface 202 smaller than the lower surface 201, and four inclined side surfaces 203 for connecting the lower surface 201 and the upper surface 202.

In the operation of forming a modified layer in the workpiece 20 to thereby form a predetermined pattern, the substrate 21 on which the workpiece 20 is mounted is placed on the chuck table 36 of the laser processing apparatus 1 shown in FIG. 1. Thereafter, the suction means (not shown) is operated to hold the workpiece 20 through the substrate 21 on the chuck table 36 under suction (workpiece holding step).

Thereafter, the feeding means 37 is operated to move the chuck table 36 holding the workpiece 20 to a position directly below the imaging means 6. In this condition, the imaging means 6 is operated to image the two corners E1 and E2 of all the four corners E1, E2, E3, and E4 of the upper surface 202 of the workpiece 20 shown in FIG. 8. An image signal obtained by the imaging means 6 is transmitted to the control means 7. The control means 7 is then operated to check whether or not the line connecting the corners E1 and E2 is parallel to the X direction according to the image signal transmitted from the imaging means 6. If the line connecting the corners E1 and E2 is not parallel to the X direction, the chuck table 36 is rotated to adjust the direction of the workpiece 20 so that the line connecting the corners E1 and E2 becomes parallel to the X direction. Thereafter, the four corners E1, E2, E3, and E4 of the upper surface 202 of the workpiece 20 are imaged and an image signal obtained is transmitted to the control means 7. The control means 7 is then operated to obtain the coordinate values for the four corners E1 to E4 according to the image signal transmitted from the imaging means 6 and store the coordinate values obtained above into the random access memory (RAM) 73 (alignment step).

Figure 9A:
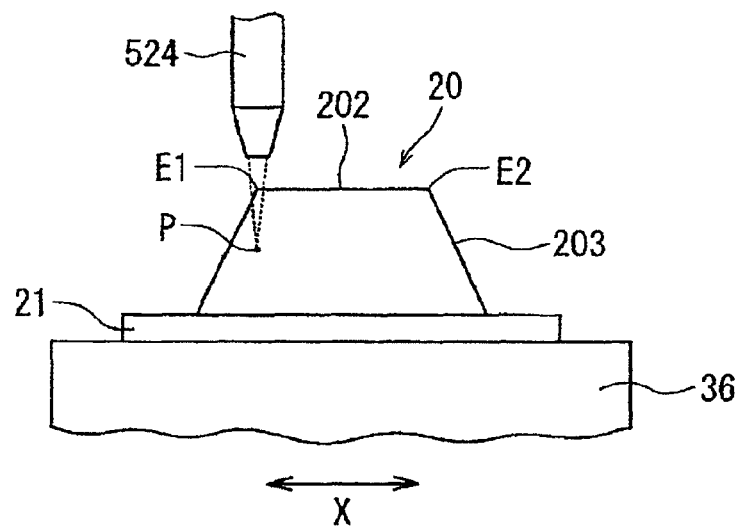
FIGS. 9A and 9B are sectional side views for illustrating the second preferred embodiment of the modified layer forming method according to the present invention.
Figure 9B:
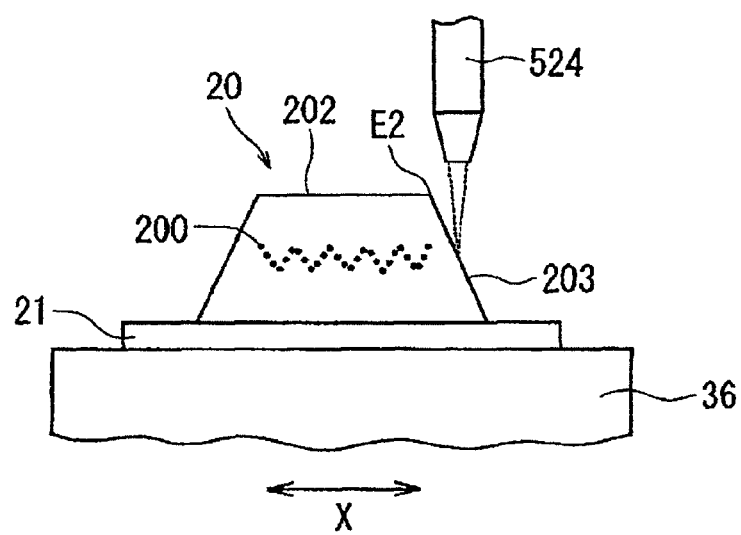

After performing the alignment step mentioned above, the feeding means 37 and the first indexing means 38 are operated to move the chuck table 36 to a position where the upper surface 202 of the workpiece 20 held on the chuck table 36 is located directly below the focusing means 524 as shown in FIG. 9A. Further, the focal position adjusting means 53 is operated to set the focal point P of the laser beam to be applied from the focusing means 524 at a predetermined position inside the workpiece 20. Thereafter, the laser beam applying means 52 is operated to apply the pulsed laser beam having a transmission wavelength to the workpiece 20 from the focusing means 524 through the upper surface 202 as a beam entrance surface into the workpiece 20. At the same time, the chuck table 36 is moved in the X direction and the Y direction according to a preset program, and the focal position adjusting means 53 is also operated to move the focal point P in the Z direction according to a preset program (modified layer forming step). In the event that the inclined side surface 203 adjacent to the upper surface 202 as a beam entrance surface is located at the beam entrance position of the pulsed laser beam directly below the focusing means 524 due to any scanning error as shown in FIG. 9B, the control means 7 outputs a control signal to the power adjusting means 523 so that the power of the pulsed laser beam oscillated by the pulsed laser beam oscillating means 522 is reduced at the time the point E2 is passed through the beam entrance position of the pulsed laser beam. At this time, the reduced power of the pulsed laser beam is a power that cannot process the workpiece 20 and includes zero power. Accordingly, even when the focal point P of the pulsed laser beam is located on the inclined side surface 203, no ablation occurs. As a result, a predetermined pattern 200 as a modified layer is formed inside the workpiece 20 by the pulsed laser beam applied through the upper surface 202 as a beam entrance surface as shown in FIG. 9B.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A modified layer forming method of applying a pulsed laser beam having a transmission wavelength to a workpiece to thereby form a modified layer inside said workpiece, wherein said workpiece includes a beam entrance surface that defines a plane that is perpendicular to an optical path of said pulsed laser beam and a surface adjacent to said beam entrance surface that is not formed on the same plane as said beam entrance surface, said modified layer forming method comprising:

a modified layer forming step of applying said pulsed laser beam to said workpiece through said beam entrance surface in the condition where the focal point of said pulsed laser beam is set inside said workpiece, thereby forming said modified layer inside said workpiece; and a power reducing step of reducing the power of said pulsed laser beam to a power that cannot process said workpiece when said surface adjacent to said beam entrance surface of said workpiece is located at the beam entrance position of said pulsed laser beam, wherein the method further comprises:
storing a first set of coordinates as feed start positions;
storing a second set of coordinates as feed stop positions;
wherein said first and second sets of coordinates are set on the boundary between said beam entrance surface and said surface adjacent thereto, such that during said modified layer forming step, a modified layer is formed between one of said feed start positions and an associated one of said feed stop positions.

2. The modified layer forming method according to claim 1, wherein said power that cannot process said workpiece in said power reducing step includes zero power.

3. The modified layer forming method according to claim 1, wherein:
the workpiece is a cylindrical wafer;
said surface adjacent to the beam entrance surface is formed on the outer circumferential portion of said wafer, and said surface adjacent to the beam entrance surface is formed as an arcuate surface extending between front and back sides of said wafer.

4. A modified layer forming method of applying a pulsed laser beam having a transmission wavelength to a workpiece to thereby form a modified layer inside said workpiece, wherein said workpiece includes a beam entrance surface that defines a plane that is perpendicular to an optical path of said pulsed laser beam and a surface adjacent to said beam entrance surface that is not formed on the same plane as said beam entrance surface, said modified layer forming method comprising:

a modified layer forming step of applying said pulsed laser beam to said workpiece through said beam entrance surface in the condition where the focal point of said pulsed laser beam is set inside said workpiece, thereby forming said modified layer inside said workpiece; and a power reducing step of reducing the power of said pulsed laser beam to a power that cannot process said workpiece when said surface adjacent to said beam entrance surface of said workpiece is located at the beam entrance position of said pulsed laser beam, wherein said surface adjacent to said beam entrance surface is an arcuate surface extending between front and back sides of said workpiece.

5. A modified layer forming method of applying a pulsed laser beam having a transmission wavelength to a workpiece to thereby form a modified layer inside said workpiece, wherein said workpiece includes a beam entrance surface that defines a plane that is perpendicular to an optical path of said pulsed laser beam and a surface adjacent to said beam entrance surface that is not formed on the same plane as said beam entrance surface, said modified layer forming method comprising:

a modified layer forming step of applying said pulsed laser beam to said workpiece through said beam entrance surface in the condition where the focal point of said pulsed laser beam is set inside said workpiece, thereby forming said modified layer inside said workpiece; and a power reducing step of reducing the power of said pulsed laser beam to a power that cannot process said workpiece when said surface adjacent to said beam entrance surface of said workpiece is located at the beam entrance position of said pulsed laser beam, wherein the workpiece is of a truncated rectangular pyramid shape including four inclined side surfaces; and wherein said four inclined side surfaces define said surface adjacent to the beam entrance surface.

\* \* \* \* \*